May 7, 1968   A. J. LOWDERMILK, JR   3,382,125
METHOD OF MAKING MATS
Filed May 20, 1964

INVENTOR.
ALFRED J. LOWDERMILK, JR.
BY
J. B. Holden
ATTORNEY

United States Patent Office 3,382,125
Patented May 7, 1968

3,382,125
METHOD OF MAKING MATS
Alfred J. Lowdermilk, Jr., Cuyahoga Falls, Ohio, assignor to The Goodyear Tire & Rubber Company, Akron, Ohio, a corporation of Ohio
Filed May 20, 1964, Ser. No. 368,940
4 Claims. (Cl. 156—214)

This invention relates to a method of manufacturing mats of rubber or other formable materials and more particularly to contoured floor mats such as used in automotive vehicles and the like in which the padding or cushioning material is integrally attached to the back side of the mat during the forming and/or vulcanization of the mat material.

Heretofore, it has been the practice to form the mat and trim either as a part of the forming operation or as a separate step after the forming has been complete. The most recent method has been to trim during the initial stages of the forming operation and prior to the forming and vulcanizing of the rubber stock as shown by United States Patent 3,042,969 whereby the vulcanized mat is of the exact peripheral configuration desired including a finished edge. The cushioning material then by a subsequent operation is applied to the back of the mat. The usual practice is to apply cement to a pre-cut layer of the material, then position it on the back of the mat prior to packaging for shipping to the customer.

In the instant invention a pre-cut layer of the cushioning material is placed on the mat in the proper position prior to vulcanization so that the adhesive adheres the cushioning material to the mat material during the vulcanization and forming step. As a result, the mat after vulcanization is ready for immediate shipment to the customer without any subsequent operation. It is, therefore, an object of this invention to provide a method of manufacturing a mat with the cushioning material applied simultaneously with the vulcanizing and forming operation.

A further object of the invention is to provide a method to eliminate the necessity of separately applying the cushioning material to the back of the vulcanized mat.

A still further object of the invention is to provide means to obtain good adhesion between the cushioning material and mat stock.

Still another object of this invention is to eliminate the necessity of applying separately an adhesive to effect the adhesion of the cushioning material to the mat.

These and other objects and advantages of this invention will become apparent hereinafter as the description thereof proceeds, the novel features, arrangements and combinations being clearly pointed out in the specification as well as the claims thereunto appended.

Figure 1:
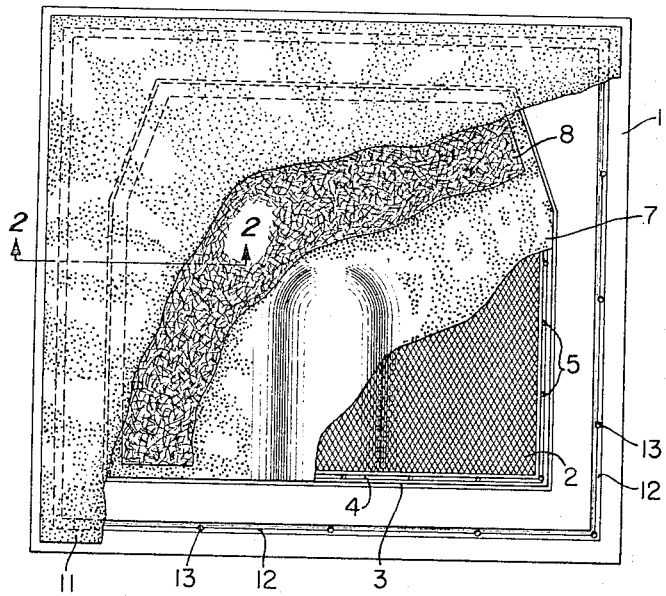
Figure 2:
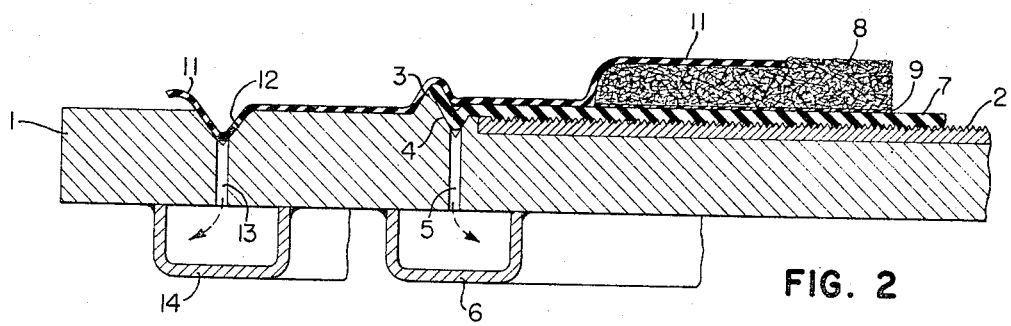
Figure 4:
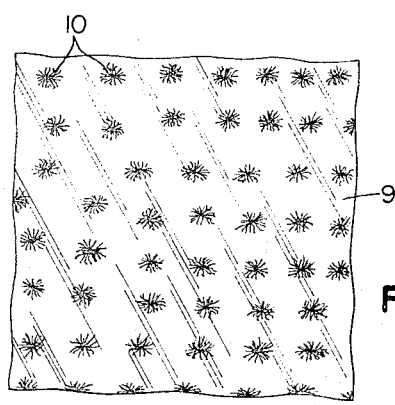
Figure 3:
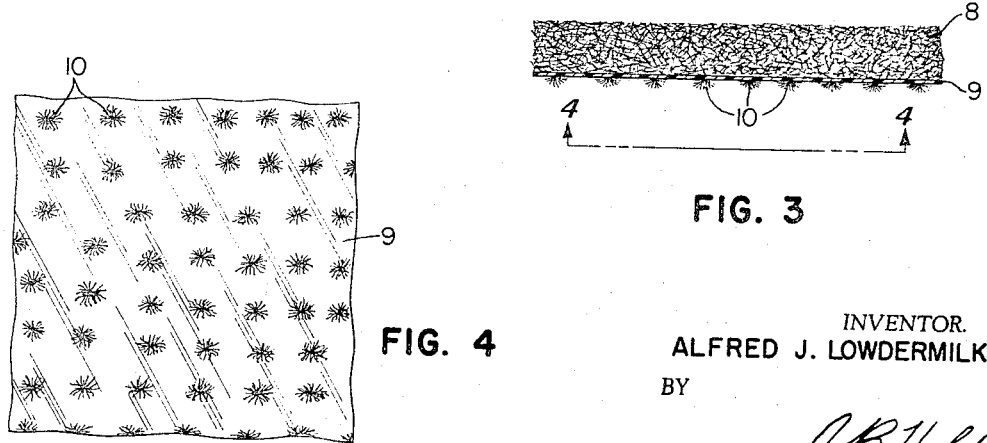

In the drawings:
FIG. 1 is a plan view of a typical mold with portions of the several layers removed;
FIG. 2 is a partial section taken along line 2—2 of FIG. 1;
FIG. 3 is an enlarged section of the cushioning material prior to application to the mat; and
FIG. 4 is a view taken on line 4—4 of FIG. 3.

In FIGS. 1 and 2, numeral 1 represents a mold base typically comprised of an insert 2 having the particular surface configuration desired for the finished mat. Usually the mold surface is also contoured to correspond to that of the automobile compartment in which the mat is used. The general mold construction to produce the contoured automobile floor mats may be of any of the desired constructions which are well known in the art.

As best seen in FIG. 2, a typical construction presently used includes a trimming edge 3 defining the outer periphery of the mat. As shown, trimming edge 3 is an upstanding V-shaped edge immediately adjacent a V-groove 4 lying immediately adjacent the entire periphery of the insert 2. A comparable structure may be provided also around the periphery of openings and cut-outs which are formed in the mats. At spaced intervals in the grooves 4 are a series of small holes or openings 5 leading to a vacuum channel 6 on the lower surface of the mold base. A vacuum is applied to channel 6 after the mat blank 7 is placed over the mold to withdraw the air between the mat blank 7 and the insert 2 surface to provide intimate contact between the blank 7 and mold surface. The blank 7 lying over the trimming edge 3 is then severed by running a roller over the mat blank 7 at this point and the excess material is removed for salvage. The mat blank preferably is a vulcanizable elastomeric material such as rubber but may be of a formable plastic material. For the purposes of description it will be assumed that the blank is of a vulcanizable material but the necessary changes in procedure are well known if a plastic material is used. The vacuum in channel 6 remains on and maintains blank 7 in intimate contact and the trimmed edge presents a neat appearing finished edge to the mat after vulcanization.

A layer 8 of cushioning material is applied to the exposed surface of the mat blank 7 prior to vulcanization or forming. Preferably layer 8 of cushioning material is of less overall dimension than the finished mat so as to leave a marginal portion of the mat without cushioning material. A jute or other fibrous cushioning material preferably is used and is prepared prior to application to the back of mat blank 7 by dieing or cutting out to the desired peripheral configuration. In order to adhere layer 8 of cushioning material to mat blank 7, it has been found that a relatively thin layer 9 of a plastic material, such as polyethylene, provides an excellent adhesive. Other materials, thermoplastic or thermosetting, if desired, may be used for the layer 9, the essential requirement being that the material sufficiently soften to effect adhesion at the operating temperature and also adhere satisfactorily to both the mat material and cushioning layer. The film 9 of polyethylene can be applied to the surface of the jute by the needling operation usually used in the manufacture of the jute layer. In the needling operation, needles pass through the jute at spaced intervals and polyethylene film 9 thus pulling a few of the jute fibers 10 through the polyethylene to flower out over the surface of the polyethylene (FIGS. 3 and 4) film 9 to mechanically interlock the jute fibers together and also the film 9 to the jute. In many instances, the jute and polyethylene film laminate may be died out by the jute manufacturer and shipped, ready for application to the mat, thus eliminating unnecessary handling of the jute by the mat manufacturer.

The jute material with the polyethylene film thereon is positioned on the exposed surface of mat blank 7 so that the film is in contact with the mat blank. A flexible, air impervious blanket 11 covering mat blank 7 and jute and extending therebeyond is placed in position so that the extending portions engage a vacuum groove 12 with spaced openings 13 positioned therein. Openings 13 are in communication with a vacuum channel 14 connected to a source of vacuum independent of that connected to vacuum channel 6. The vacuum in channel 14 withdraws the air between blanket 11 and layer 8 of jute or cushioning material to pull layer 8 of cushioning material down against mat blank 7 and assume the same contour.

Mold base 1 with mat blank 7 and layer 8 of cushioning material along with blanket 11 held in position by the vacuum in channels 6 and 14 respectively, is then subjected to an elevated temperature sufficient to vulcanize the elastomeric material of mat base 7. This can be accomplished by placing the assembly in a chamber in which steam under pressure creates the desired temperature in the chamber or by heating the under surface of the mold base 1 to an elevated temperature thus vulcanizing the elastomeric material of the mat by heat transfer from the mold surface. Blanket 11 protects the exposed surface of the jute from the effects of steam or other harmful elements.

Simultaneously with the vulcanization of the mat material, the film 9 of polyethylene softens sufficiently to firmly adhere to both the jute of layer 8 and the elastomeric material of the mat. At the completion of the vulcanization the vacuum in channels 6 and 14 is released and blanket 11 removed prior to subsequently removing the finished mat from the mold. It is not only necessary to package the mat for shipment to the vehicle manufacturer. If the blank 7 of mat material is not trimmed prior to vulcanization, it will be necessary to trim the mat prior to shipment which can be done by conventional methods.

While certain representative embodiments and details have been shown for the purpose of illustrating the invention, it will be apparent to those skilled in the art that various changes and modifications may be made therein without departing from the spirit or scope of the invention.

I claim:

1. A process of vulcanizing floor mats having a predetermined surface configuration on one surface and a layer of cushioning material adhered to the opposite surface thereof, comprising the steps of placing one surface of a sheet of substantially air impervious vulcanizable mat stock on a mold having a surface of the predetermined configuration and contour, applying a vacuum between the sheet of stock and mold surface to cause intimate contact of the mold surface by the matstock, positioning a layer of cushioning material on the exposed surface of the mat stock, said layer of cushioning material having a film of plastic material affixed to one side thereof and substantially coextensive therewith, with the film being placed against the exposed surface of the mat stock, the layer of cushioning material extending no further than the peripheral margin of the mat stock, covering the mat stock and cushioning material with a sheet of flexible air impervious material with a portion thereof extending beyond the peripheral margin of said mat stock and layer of cushioning material, applying from a second source, a vacuum between said covering sheet and cushioning material to urge the cushioning material into intimate contact with the sheet of mat stock, maintaining each vacuum while subjecting the sheet of mat stock to an elevated temperature to vulcanize said mat stock and simultaneously soften said thermoplastic film whereby the cushioning material is firmly fixed to the mat stock by the film of plastic material as it softens to firmly adhere to both the mat stock and cushioning material.

2. A process as claimed in claim 1 in which the plastic material is polyethylene.

3. A process as defined in claim 1 in which the assembly of mold, mat stock, cushioning material and sheet of air impervious material with the vacuums maintained are placed in a steam pressure autoclave for vulcanization of the mat stock and softening of the plastic film to effect adhesion of the cushioning material to the mat stock whereby the vulcanization of the mat stock and softening of the plastic film is effected by heat transfer from the mold surface through the mat stock to the film layer.

4. A process of vulcanizing floor mats having a predetermined surface configuration on one surface and a layer of cushioning material on the opposite surface thereof, comprising the steps of placing one surface of a sheet of substantially air impervious vulcanizable mat stock on a mold having a surface of the predetermined configuration and contour, said mold including a trimming surface defining the peripheral margin of the finished mat and a sealing surface adjacent said trimming surface on the mat side of said trimming edge with a vacuum chamber in communication with said sealing surface, applying a vacuum to said chamber to cause intimate contact between the mat stock and both the mold surface and trimming edge, severing the mat stock at said trimming edge, positioning a layer of cushioning material on the exposed surface of the mat stock, said layer of cushioning material having a film of polyethylene affixed to one side thereof and substantially coextensive therewith with the film being placed against the exposed surface of the mat stock, the layer of cushioning material extending no further than the peripheral margin of the mat stock, covering the mat stock and cushioning material with a sheet of flexible air impervious material with a portion thereof extending beyond the peripheral margin of said mat stock and layer of cushioning material and contacting a second sealing surface with a vacuum chamber in communication therewith, applying from a second source, a vacuum to said second chamber to urge said covering sheet into intimate contact witth the cushioning material whereby the cushioning material is pressured into intimate contact with the sheet of mat stock, maintaining each vacuum while subjecting the sheet of mat stock to an elevated temperature to vulcanize said mat stock and simultaneously soften said polyethylene film whereby the cushioning material is firmly fixed to the mat stock by the polyethylene film as it softens to firmly adhere to both the mat stock and cushioning material.

References Cited

UNITED STATES PATENTS

| | | | |
|---|---|---|---|
| 2,258,238 | 10/1941 | Collins | 156—156 |
| 3,042,969 | 7/1962 | Shaul | 264—90 |
| 1,908,682 | 5/1933 | Bronson | 156—285 X |
| 2,621,138 | 12/1952 | Messing | 156—209 |
| 2,873,227 | 2/1959 | Olson et al. | 156—294 X |
| 2,890,146 | 6/1959 | Unsworth | 156—148 X |
| 3,245,854 | 4/1966 | Etchison et al. | 156—148 |

EARL M. BERGERT, *Primary Examiner.*

H. F. EPSTEIN, *Assitant Examiner.*